United States Patent
Heinze

(10) Patent No.: US 8,423,370 B2
(45) Date of Patent: *Apr. 16, 2013

(54) AUTOMATED INTERPRETATION OF CLINICAL ENCOUNTERS WITH CULTURAL CUES

(75) Inventor: Daniel T. Heinze, San Diego, CA (US)

(73) Assignee: A-Life Medical, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/089,823

(22) Filed: Apr. 19, 2011

(65) Prior Publication Data

US 2011/0196665 A1 Aug. 11, 2011

Related U.S. Application Data

(63) Continuation of application No. 11/686,164, filed on Mar. 14, 2007, now Pat. No. 7,949,538.

(60) Provisional application No. 60/782,694, filed on Mar. 14, 2006.

(51) Int. Cl.
*G10L 21/00* (2006.01)
*G06F 17/28* (2006.01)
*G06F 17/20* (2006.01)
*G06F 17/27* (2006.01)

(52) U.S. Cl.
USPC .................. 704/277; 704/2; 704/8; 704/9

(58) Field of Classification Search .................. None
See application file for complete search history.

(56) References Cited

U.S. PATENT DOCUMENTS

| | | | |
|---|---|---|---|
| 3,996,672 A | 12/1976 | Osofsky et al. |
| 5,483,443 A | 1/1996 | Milstein et al. |
| 5,583,758 A | 12/1996 | McIlroy et al. |
| 5,594,638 A | 1/1997 | Iliff |
| 5,619,709 A | 4/1997 | Caid et al. |
| 5,675,819 A | 10/1997 | Schuetze |
| 5,680,511 A | 10/1997 | Baker et al. |
| 5,778,157 A | 7/1998 | Oatman et al. |
| 5,794,178 A | 8/1998 | Caid et al. |
| 5,809,476 A | 9/1998 | Ryan |
| 5,873,056 A | 2/1999 | Liddy et al. |
| 5,900,871 A | 5/1999 | Atkin et al. |
| 5,995,955 A | 11/1999 | Oatman et al. |
| 6,055,494 A | 4/2000 | Friedman |
| 6,081,774 A | 6/2000 | De Hita et al. |
| 6,137,911 A | 10/2000 | Zhilyaev |

(Continued)

OTHER PUBLICATIONS

"Introducing SNOMED CT" (online) [Retrieved Dec. 21, 2010]; Retrieved from the Internet URL: www.ihtsdo.org/publications/introducing-snomed-ct/; 2 pgs.

(Continued)

*Primary Examiner* — Brian Albertalli
(74) *Attorney, Agent, or Firm* — Nathaniel P. Longley; Bridget M. Hayden; Dorsey & Whitney LLP

(57) ABSTRACT

A method, system and a computer program product for an automated interpretation and translation are disclosed. An automated interpretation occurs by receiving language-based content from a user. The received language-based content is processed to interpret the received language-based content into a target language. Also, a presence of a cultural sensitivity in the received language-based content is detected. Further, an appropriate guidance for dealing with the detected cultural sensitivity is provided.

26 Claims, 3 Drawing Sheets

U.S. PATENT DOCUMENTS

| | | | |
|---|---|---|---|
| 6,182,029 | B1 | 1/2001 | Friedman |
| 6,389,405 | B1 | 5/2002 | Oatman et al. |
| 6,498,982 | B2 | 12/2002 | Bellesfield et al. |
| H2098 | H | 3/2004 | Morin |
| 6,866,510 | B2 | 3/2005 | Polanyi et al. |
| 6,915,254 | B1 | 7/2005 | Heinze |
| 7,043,426 | B2 | 5/2006 | Roberge et al. |
| 7,174,507 | B2 | 2/2007 | Baudin et al. |
| 7,359,861 | B2 | 4/2008 | Lee |
| 7,360,151 | B1 | 4/2008 | Froloff |
| 7,369,998 | B2 | 5/2008 | Sarich et al. |
| 7,624,027 | B1 | 11/2009 | Stern et al. |
| 7,653,641 | B2 | 1/2010 | Theissen et al. |
| 7,908,552 | B2 | 3/2011 | Heinze |
| 7,949,538 | B2 | 5/2011 | Heinze |
| 2002/0010714 | A1 | 1/2002 | Hetherington |
| 2002/0156810 | A1 | 10/2002 | Holland et al. |
| 2003/0018251 | A1 | 1/2003 | Solomon |
| 2003/0033347 | A1 | 2/2003 | Bolle et al. |
| 2003/0115195 | A1 | 6/2003 | Fogel et al. |
| 2004/0117734 | A1 | 6/2004 | Krickhahn |
| 2004/0172297 | A1 | 9/2004 | Rao et al. |
| 2004/0254816 | A1 | 12/2004 | Myers |
| 2005/0071185 | A1 | 3/2005 | Thompson |
| 2005/0261910 | A1 | 11/2005 | Precoda et al. |
| 2006/0129922 | A1 | 6/2006 | Walker |
| 2007/0061348 | A1 | 3/2007 | Holland et al. |
| 2007/0094030 | A1 | 4/2007 | Xu |
| 2007/0226211 | A1 | 9/2007 | Heinze et al. |
| 2008/0222518 | A1 | 9/2008 | Walker |
| 2008/0256108 | A1 | 10/2008 | Heinze et al. |
| 2008/0256329 | A1 | 10/2008 | Heinze et al. |
| 2008/0282153 | A1 | 11/2008 | Kindeberg et al. |
| 2009/0070140 | A1 | 3/2009 | Morsch et al. |
| 2009/0144617 | A1 | 6/2009 | Funes et al. |
| 2009/0175550 | A1 | 7/2009 | Taleb |
| 2010/0064131 | A1 | 3/2010 | Spatscheck et al. |
| 2010/0195909 | A1 | 8/2010 | Wasson et al. |
| 2010/0257444 | A1 | 10/2010 | Bever et al. |

OTHER PUBLICATIONS

"Value Proposition for SNOMED CT" (online) [Retrieved Dec. 21, 2010]; Retrieved from the Internet URL: www.ihtsdo.org/fileadmin/user_upload/Docs_01/Publications/SNOMED_CT/SNOMED_CT_Benefits_v4.pdf; 3 pgs.

"SNOMED Clinical Terms User Guide Jan. 2010 International Release (US English)" (online) [Retrieved Dec. 21, 2010]; Retrieved from the Internet URL: www.ihtsdo.org/fileadmin/user_upload/Docs_01/Publications/doc_userguide_current-en-US_INT_20100131.pdf.; 99 pages.

"SNOMED Clinical Terms Overview" (online) [Retrieved Dec. 21, 2010]; retrieved from the Internet URL: www.ihtsdo.org/fileadmin/user_upload/Docs_01/Recourses/Introducing_SNOMED_CT/SNOMED_CT_Overview)_IHTSDO_Taping_Aug08.pdf.; 82 pgs.

"SNOMED Clinical Terms Basics" (online) [Retrieved Dec. 21, 2010]; retrieved from the Internet URL: www.ihtsdo.org/fileadmin/user_upload/Docs_01/Recourses/Introducing_SNOMED_CT/SNOMED_CT_Basics_IHTSDO_Taping_Aug08.pdf; 82 pgs.

"SNOMED Clinical Terms Fundamentals" (online) [Retrieved Dec. 21, 2010]; retrieved from the Internet URL: www.ihtsdo.org/fileadmin/user_upload/docs_01/SNOMED_Clinical_Terms_Fundamentals.pdf.; 56 pgs.

"SNOMED CT Browsers" (online) [Retrieved Dec. 21, 2010]; Retrieved from the Internet URL: www.nim.nih.gov/research/umls/Snomed/snomed_browsers.html; 2 pgs.

"HL7 Clinical Document Architecture, Release 2.0" (online) [Retrieved Dec. 20, 2010]; Retrieved from the Internet URL: www.hl7.org/v3ballot/html/foundationdocuments/cda/cda.htm; 190 pgs.

Friedman, et al. "Natural language processing in an operational clinical information system," Natural Language Engineering, vol. 1(1): 83-108 (May 1995).

Zingmond and Lenert. "Monitoring Free-Text Data Using Medical Language Processing," Computers and Biomedical Research, vol. 26: 467-481 (1993).

Lehnert, Soderland, Aronow, Feng, and Shmueli. "Inductive Text Classification for Medical Applications," to appear in Journal for Experimental and Theoretical Artificial Intelligence, Brookline, MA (date unknown).

Larkey and Croft. "Automatic Assignment of ICD9 Codes to Discharge Summaries," UMass Center for Intelligent Information Retrieval, Amherst, MA (date unknown).

Sneiderman, Rindflesch, and Aronson. "Finding the Findings: Identification of Findings in Medical Literature Using Restricted Natural Language Processing," Bethesda, MD (1996).

Aronow, Cooley, and Soderland. "Automated Identification of Episodes of Asthma Exacerbation for Quality Measurement in a Computer-Based Medical Record," Brookline, MA and Amherst, MA (date unknown).

Croft, Callan, and Aronow. "Effective Access to Distributed Heterogeneous Medical Text Databases," Medinfo 96 Proceedings, Amherst, MA (1995).

Aronow, Soderland, Feng, Croft and Lehnert. "Automated Classification of Encounter Notes in a Computer Based Medical Record," Amherst, MA (date unknown).

Aronow and Shmueli. "A PC Classifier of Clinical Text Documents: Advanced Information Retrieval Technology Transfer," Amherst, MA (1996).

Aronow and Feng, "Ad-Hoc Classification of Electronic Clinical Documents," D-Lib Magazine, Amherst, MA, 1997.

Soderland, Aronow, Fisher, Aseltine and Lehnert. "Machine Learning of Text Analysis Rules for Clinical Records," Amherst, MA and Brookline, MA (date unknown).

Yang and Chute. "An Application of Least Squares Fit Mapping to Clinical Classification," 16.sup.th Annual Symposium on Computer Application in Medical Care, pp. 460-464, Rochester, MN (1993).

Ranum. "Knowledge Base Understanding of Radiology Text," 12.sup.th Annual Symposium on Computer Application in Medical Care, pp. 141-145, Rochester, MN (1988).

Sager, Lyman, Nhan, and Trick. "Automatic Encoding into SNOMED III: A Preliminary Investigation," 18.sup.th Annual Symposium on Computer Application in Medical Care, pp. 230-234, New York, NY (1994).

Lenert and Tovar. "Automated Linkage of Free-Text Descriptions of Patients with a Practice Guideline," 17.sup.th Annual Symposium on Computer Application in Medical Care, pp. 274-278, Stanford, CA (1993).

Sager, Lyman, Bucknail, Nhan, and Trick. "Natural Language Processing and the Representation of Clinical Data," Journal of the American Medical Information Association, vol. 1, No. 2, pp. 142-160, New York, NY (Mar./Apr. 1994).

Furuse et al. "Constituent Boundary Parsing for Example-Based Machine Translation," Google, pp. 105-111 (1994).

Starosta et al. "Lexicase Parsing: A Lexicon-driven Approach to Syntactic Analysis," Google, pp. 127-132 (1986).

Neubauer, Aljoscha Steffen. "The EWMA control chart," Clinical Chemistry, 43(4): 594-601 (1997).

Department of Health and Human Services—OIG Office of Audit Services. Rat-Stats Companion Manual (Sep. 2001).

Department of Health and Human Services—OIG Office of Audit Services. Rat-Stats User Guide (Sep. 2001).

AUTOMATED INTERPRETATION OF CLINICAL ENCOUNTERS WITH CULTURAL CUES

CLAIM OF PRIORITY

This application is a continuation of U.S. patent application Ser. No. 11/686,164, filed Mar. 14, 2007, which claims priority under 35 USC §119(e) to U.S. Patent Application Ser. No. 60/782,694, filed on Mar. 14, 2006, the entire contents of which are hereby incorporated by reference.

TECHNICAL FIELD

The following disclosure relates to computer natural language processing (NLP), and more particularly to a system and method of interpreting and translating social and cultural sensitivities.

BACKGROUND

Inadequate cross-language and cross-cultural communications can present a problem in medical interpretation, which may lead to errors in medical care. For example, patients may be hesitant to communicate fully and openly with physicians due to a variety of cultural influences such as 1) embarrassment or cultural norms, 2) misunderstandings regarding offered treatments based on differing medical practices in the patient's native environment, and 3) in some cases, a lack of terminology by which western medical concepts can be easily translated to the patient.

While the demand for qualified medical interpreters remains high, there are simply not enough available interpreters to meet the demand. Consequently, only a fraction of hospitals may be able to provide professionally trained interpreters. What's worse, many of the interpreters may lack adequate training in medical terminology. Machine translation may provide a viable option. The demands of medicine, however, tend to require that the matter be approached in a manner different from or more comprehensive than those employed in translating web pages or interpreting tourism related queries and responses. Specific needs of both physicians and patients often motivate the quest for medically accurate and culturally attuned communication.

SUMMARY

Techniques for providing automated translation and interpretation are disclosed.

In one aspect, an automated interpretation occurs by receiving language-based content from a user. The received language-based content is processed to interpret the received language-based content into a target language. Also, a presence of a cultural sensitivity in the received language-based content is detected. Further, guidance for dealing with the detected cultural sensitivity is determined.

Implementations can optionally include one or more of the following features. Processing the received language-based content can include translating the language-based content into the target language. An output of the interpretation and translation can be generated as at least one of electronic text data and electronic speech data. Also, a presence of a social sensitivity can be detected in the received language-based content. In addition, an interlingua for an automated interpretation in a clinical encounter can be generated. The interlingua generated can include a Clinical Document Architecture—Revision 2 (CDA-2) implemented in conjunction with a formal medical vocabulary system. Also, a determination can be made to decide whether processing the language-based content requires a human review. Further, the received language-based content can be classified as having an immediate importance during a medical encounter. Alternatively, the language-based content can be classified as having a durable importance beyond a temporal scope of a medical encounter. A representation of the language-based content classified as having a durable importance can be stored in an electronic health record, and the representation of the classified content can include a CDA-2 representation. Also, one or more identifiers can be applied to the received language-based content. The identifiers can be associated with one or more warnings related to a subject matter known to have cultural sensitivities for the user in the target language. Alternatively, the identifiers can be associated with a subject matter that is difficult to translate into the target language.

In another aspect, a system for providing an automated translation include a receiving unit designed to receive a verbal communication from a user. The system also includes a processing unit in communication with the receiving unit. The processing unit is designed to identify a presence of a cultural sensitivity in the received verbal communication, determine guidance for dealing with the identified cultural sensitivity, and interpret the received verbal communication. The system further includes a storage unit in communication with the processing unit. The storage unit is designed to store medical information.

Implementations of the system can optionally include one or more of the following features. The processing unit of the system can further include a speech recognition unit designed to convert the received verbal communication into a written format, and a translation unit designed to translate the written format into a target language. An output of the interpretation and translation can be rendered as at least one of electronic text data and electronic speech data. The processing unit can be designed to detect a presence of a social sensitivity in the received verbal communication. Further, the processing unit can be designed to generate an interlingua for an automated interpretation in a clinical encounter. The generated interlingua can include a Clinical Document Architecture—Revision 2 (CDA-2) implemented in conjunction with a formal medical vocabulary system. Also, the processing unit can be designed to determine whether interpreting the received verbal communication requires a human review. The processing unit can be further designed to classify the received verbal communication as having an immediate importance during a medical encounter. Alternatively, the processing unit can be designed to classify the received verbal communication as having a durable importance beyond a temporal scope of a medical encounter. A representation of the verbal communication classified as having a durable importance can be stored in an electronic health record, and the representation can include a CDA-2 representation. The processing unit can also be designed to apply one or more identifiers to the received verbal communication. The identifiers are associated with one or more warnings related to a subject matter known to have cultural sensitivities for the user in the target language. Alternatively, the identifiers are associated with a subject matter that is difficult to translate into the target language.

In yet another aspect, techniques can be implemented as a computer program product, embodied in a computer readable medium, is operable to cause a data processing apparatus to perform operations as described herein.

These aspects can be implemented using an apparatus, a method, a system, or any combination of an apparatus, methods, and systems. The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Techniques are disclosed for implementing natural language processing (NLP) to automate translation between different languages during medical encounters. NLP is provided by the LifeCode® engine as described in U.S. Pat. No. 6,915,254 "Automatically Assigning Medical Codes Using Natural Language Processing," which is incorporated herein by reference in its entirety. In some implementations, methods and techniques that extend the NLP concept of U.S. Pat. No. 6,915,254 are used. For example, techniques of co-pending patent applications entitled "Multi-magnitudinal Vectors with Resolution Based on Source Vector Features" and "Mere-Parsing with Boundary and Semantic Driven Scoping," which are both incorporated herein by reference in their entireties, can be used.

The techniques described herein can be implemented to is facilitate recognition and determine guidance for dealing with social and cultural sensitivities during the process of medical interpretation and translation. In some implementations, interpretation is used in its proper sense of dealing with spoken communication, whereas translation deals with written communication. Techniques implemented as described herein can be used to provide accurate medical interpretation and translation to assure that appropriate medical services are rendered to patients. The output of translation and/or interpretation, as described herein, is rendered as at least one of electronic text data or electronic speech data. For example, interpreted and/or translated electronic text data can be used as a part of a medical record and interpreted and/or translated electronic speech data can be used to communicate with a patient.

Figure 1:
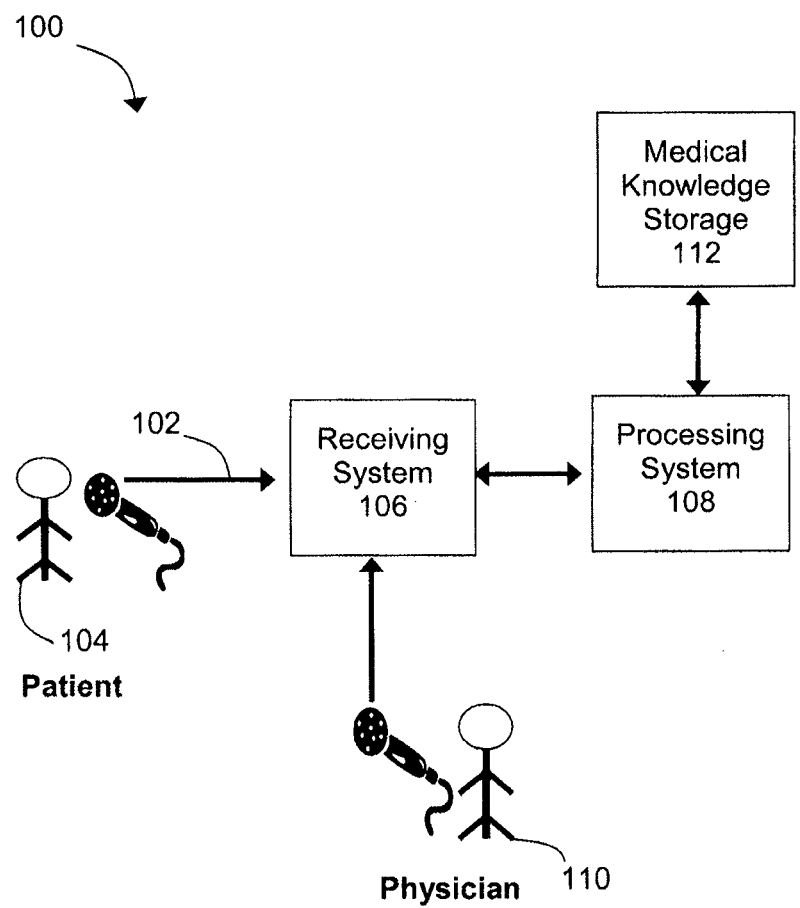
FIG. 1 is a high-level functional block diagram of a an automated system for interpreting cultural and social sensitivities.

FIG. 1 is a functional block diagram describing an automated system 100 for interpreting and translating social and cultural sensitivities while performing medical translations. An automated system 100 can be created to assist and augment the human practitioner. Instead of attempting to replace the human practitioner, an automated system 100 can be designed to off-load the portions of the task that are mundane, repetitive and that can be successfully automated. During a medical encounter, a doctor may be faced with a non-English speaking patient. The language-based content 102 captured from a patient 104 speaking in a foreign (e.g., non-English) language is inputted into a receiving system 106 of the automated system 100. The automated system 100 facilitates human-machine collaboration by accurately determining if the language-based content 102 can be processed independently or if the language-based content requires human review and/or intervention. This is considered semi-knowledge le of the automated system and corresponds to the human capability to recognize that an utterance is of importance to the task at hand even though the full intent is not comprehended.

The language-based content 102 is forwarded to a is processing system 108 and processed to determine if the language-based content 102 needs expert intervention. If the processing system 108 determines that the language-based content 102 cannot be fully understood, the automated system 100 requests expert guidance from a human practitioner, such as a specially trained medical interpreter. In some implementations, the automated system 100 can be utilized to provide on-line help and meta-data to aid the human expert. This is particularly helpful in the medical field where the sheer volume of knowledge is frequently beyond the ability of a human practitioner to keep in ready memory.

The medical knowledge needed by a human expert, such as a physician can be accessed from a medical knowledge storage 112 in communication with the processing system 108. To compile the medical knowledge stored in the medical knowledge storage 112, techniques in medical ontologies can be implemented to provide unambiguous representation of the majority of clinical concepts. The following are examples of techniques in medical ontologies that can be implemented: 1) the Systematic Nomenclature of Medicine—Clinical Terminology® (SNOMED-CT) [Available from the College of American Pathologists] for the core, multilingual nomenclature of clinical concepts and 2) the Clinical Document Architecture, Release 2® (CDA2) [Available from Health Level 7®] for the framework by which complex clinical events and communications can be represented using the core nomenclature.

Interpreting and Translating Social and Cultural Sensitivities

Figure 2:
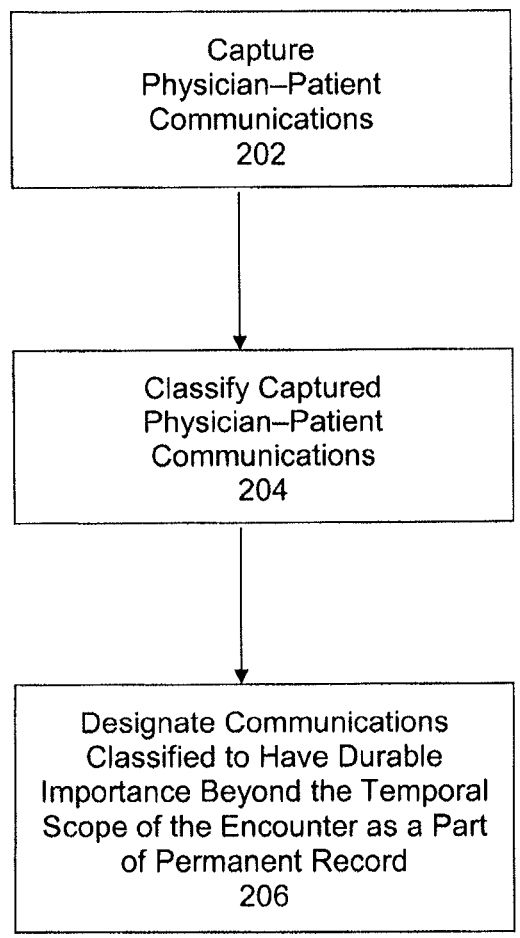
FIG. 2 is a process flow diagram of a process for classifying language-based content based on temporal importance of the content.

In one aspect of the techniques, an automated system 100 is implemented to validate communications between a physician and a patient to provide assurance that the communications have been accurate and that the course of treatment is appropriate. FIG. 2 describes a process of validating the communications between a physician and a patient during a medical encounter. The communications between a physician and a patient are captured, translated, and interpreted at 202. The interpreted communications are analyzed at 204 to determine if the quality of communications is either 1) communications that are only of immediate importance during the course of the medical encounter and 2) communications that have durable importance beyond the temporal scope of the encounter.

For example, physician directives for the patient to stand, bend, take a deep breath, etc. are determined to be in the first class of immediate importance. The accuracy of translations for communications of the first class can be easily judged by the actions of the patients. In addition, the translations of such communications are often augmented by signing, example, and physical manipulation. The communications of the second class include acquiring the patient history and review of systems, explaining diagnoses, prescribing medications and prescribing a course of treatment. Once the communications are categorized, the communications determined to be of the second class are designated at 206 to become part of the permanent record. For example, the durable content data (communications of the second class) can be stored in an Electronic Health Record (EHR) using CDA-2 for later physician review and revision. When verbal communication is received from a patient, the received verbal communication is processed to render a representation of the received verbal communication classified as having a durable importance.

The representation is stored in the EHR as a permanent record. In some implementations, a CDA-2 rendered representation is stored in the EHR.

In some implementations, communications of the second class can become a basis for both current and future medical decision making, and can facilitate accurate completion of the course of care. The validation process can facilitate both the physician's understanding of the patient's needs and the patient's understanding of the nature of their condition and the planned course of treatment.

In some implementations, an automated system 100 is implemented to capture and analyze utterance from a patient 104 based on a more comprehensive communication than simple yes/no queries from the physician 110. Such patient utterance can include patient's expression of concerns about the severity and prospective outcome relative to their medical condition, and communication of issues relative to their life situation that contributed to their condition or that may affect their ability to follow medical instructions. Based on the comprehensive communication, the automated system 100 for providing medical interpretations is implemented to compensate for social and cultural sensitivities present in the patient's 104 utterance. This allows the physician 110 during medical encounters to initiate dialogue with open-ended questions such as "How did this happen?", "Do you have any other questions?", "Does this concern you?", and the like.

NLP Based Approach

In some implementations, an automated system 100 for medical translation is implemented based on the LifeCode® NLP system (available from A-Life Medical of San Diego, Calif.) for coding and abstracting clinical documents. The LifeCode® NLP system is described in detail in U.S. Pat. No. 6,915,254, which is incorporated by reference in its entirety.

In some implementations, physician directed communication with yes/no patient responses are utilized. The responses are analyzed using back-translation on the physician side. On the patient side, multiple choice answer selections can be provided for capturing patient responses.

In some implementations, the automated system 100 divides the clinical encounter between a physician and a patient into at least nine aspects: 1) establishing rapport; 2) chief complaint; 3) history; 4) review of systems; 5) physical examination; 6) diagnoses; 7) procedures; 8) medications; 9) instructions. All but the first aspect correspond to sections of the traditional clinical note or report with representations in CDA2 and SNOMED-CT. CDA2 is primarily declarative with some capabilities to represent contingencies. These eight aspects can then be used to present information using CDA2 and SNOMED-CT with much of the clinical encounter requiring query and response.

Figure 3:
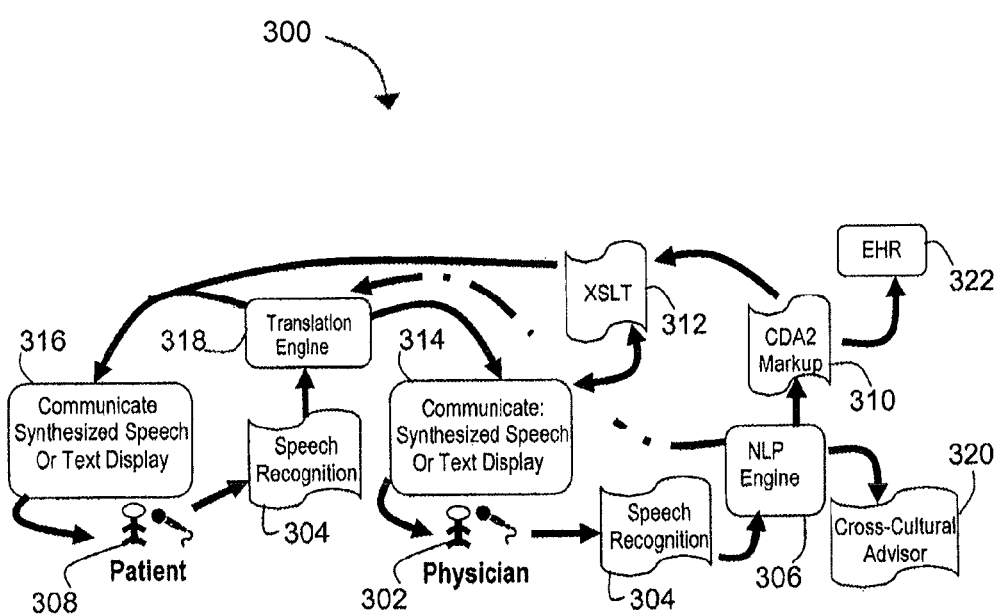
FIG. 3 is a functional block diagram of an overall communication flow in an automated system for interpreting cultural and social sensitivities.

In one aspect of the techniques, an NLP system 300 is implemented to provide an NLP engine 306 to determine the appropriate context for each physician utterance and to appropriately process and route the content of the utterance. The overall communications flow for the system is illustrated in FIG. 3. An utterance from a physician 302 is received and processed by an Automatic Speech Recognition (ASR) system 304. The ASR system 304 can be any suitable speech recognition systems available in the market, such as the SpeechMagic™ system (available from Philips of Netherlands) currently available in 23 languages. The processed utterance from the Physician 302 is forwarded to a NLP engine 306. The NLP engine 306 can selectively perform one of several processes depending on the content of the processed utterances.

The utterances that contain clinical questions or clinical statements for the patient 308 to affirm or deny or instructions are converted to CDA2 310. The converted instructions are processed by a style sheet 312 that produces the question/statement. The produced question/statement is sent for physician validation 314 and then forwarded to a patient-presentation module 316 by mapping to the patient language with, as needed, a request to affirm or deny. The style sheet 312 can be implemented using various computer languages. For example, Extensible Style Language Transformation (XSLT) can be used to create style sheets for transforming Extensible Markup Language (XML) documents.

The utterances with content that cannot be converted to CDA2 310 are routed to a general machine translation system 318. In some implementations, the content is routed for back-translation and physician approval before forwarding to the patient-presentation module 316 for presenting to the patient.

The utterances that contain references to subject matter that is deemed culturally sensitive or subject to misunderstanding is forward to a Cross-Cultural Advisor (CCA) module 320 for analysis.

In some implementations the NLP engine 306 appropriately directs information obtained from the utterance for storage in an Electronic Health Record (EHR) 322 via CDA2 310 for later physician review and revision.

In some implementations, the Cross-Cultural Advisor (CCA) module 320 can be implemented based on the NLP engine's 306 capability for recognizing and flagging (e.g., by applying identifiers or flags) clinical content that requires special attention beyond what the NLP system 300 can independently provide.

In some implementations, the flags (or identifiers) are associated with warnings related to subject matter that is known to have either cultural sensitivities for patients in the target language group or that is difficult to translate into the target language. The CCA 320 can present to the physician pre-formulated queries or informational presentations that are designed to mitigate any misunderstandings, or advise that a human interpreter should be involved. In cases where the services of a human interpreter are called for, the CCA 320 identified topic can be used to select, when available, an interpreter with training or skills appropriate to the case at hand. This can be particularly useful when Video Medical Interpretation (VMI) capabilities are used, and there is a pool of remote interpreters from which to select.

In some implementations, the CDA2 310 XML is extended by using a <Question> ... </Question> tag pair to wrap CDA observations, or, for full CDA2 compliance, the section title tags can be used as <section> <title>Question</title> <entry> ... </entry> </section>. This allows the XSLT module 312 to interpret and present CDA observations as questions to the patient 308 without having to enter them as physician remarks in the medical record until the physician 302 affirms or denies the observations.

In some implementations, a simplified encounter between a physician and a patient can be described to include at least the following communication features.

Physician: "Good morning."
Machine Translation System: "Good day."
Physician: "Okay."
Machine Translation System: "Buenos días."
Patient: "Buenos días."
Machine Translation System: "Good day."
Physician: "What seems to be the problem?"
Machine Translation System: "What seems to be the problem?"
Physician: "Okay."
Machine Translation System: "¿ Qué se parece ser el problema?"

Patient: "Caó en la ducha y lastimé mi müfieca." (patient points to left wrist)
Machine Translation System: "I fell in the shower and hurt my wrist."
Physician: "You fell in the shower and you have pain in your left wrist?"
Machine Translation System: "Please confirm: fall in shower?"
Physician: "Okay."
Machine Translation System: "Confirme por favor: ¿ caída en ducha?"
Patient: "Si."
Machine Translation System: "Yes."
Machine Translation System: "Please confirm: left wrist pain?"
Physician: "Okay."
Machine Translation System: "Confirme por favor: ¿ dolor izquierdo estructura de la región de la muñeca?"
Patient: "Si."
Machine Translation System: "Yes."
Physician: "Do you have any other pain?"
Machine Translation System: "Do you have other pain?"
Physician: "Okay."
Machine Translation System: "¿ Usted tiene otro dolor?"
Patient: "No."
Machine Translation System: "No."
Examination follows a similar course of dialogue.
Physician: "You have a bruise on the left forearm and a mild sprain of the left wrist."
Machine Translation System: "You have: left forearm contusion; mild left wrist sprain. Do you understand?"
Physician: "Okay."
Machine Translation System: "Usted tiene: contusion izquierdo del antebrazo. ¿ Usted entiende?"
Patient: "Si."
Machine Translation System: "Yes."
Machine Translation System: "Usted tiene: esguince izquierdo leve estructura de la región de la muñeca. ¿ Usted entiende?"
Patient: "Si."
Machine Translation System: "Yes."
Physician: "Instructions: no lifting for one week; take Tylenol 650 mg qid for two days."
Machine Translation System: "Instructions: no lifting; duration: 1 week. Medication: Tylenol, quantity: 650 millegrams, frequency: every 6 hours, duration: 2 days."
Physician: "Okay."
Machine Translation System: "Instrucciones: ninguna elevación; duración: 1 semana. ¿ Usted entiende?"
Patient: "Si."
Machine Translation System: "Yes."
Machine Translation System: "Medicación: Tylenol, cantidad: 650 millegrams, frecuencia: cada 6 horas, duración: 2 días. ¿ Usted entiende?"
Patient: "Si."
Machine Translation System: "Yes."
Physician: "Do you have any other concerns?"
Machine Translation System: "Do you have any other concerns?"
Physician: "Okay."
Machine Translation System: "¿ Usted tiene otras preocupaciones?"
Patient: "Estoy asustado para mi bebé."(Patient points to abdomen) "Mi marido está enojado que pude haber lastimado al bebé."
Machine Translation System: "I'm afraid for may baby. My husband is angry that I may have hurt the baby."
Physician: "Are you pregnant?"
Machine Translation System: "Are you pregnant?"
Physician: "Okay."
Machine Translation System: "¿ Es usted embarazado?"
Patient: "Si."
Machine Translation System: "Yes."
Physician: "Is your husband angry with you?"
Machine Translation System: "Warning: . . . " (Machine Translation System produces a cultural warning relative to the importance of bearing children in Hispanic cultures, marital relations . . . . The decision is made to involve an interpreter with skills in pregnancy and domestic issues.)

In another aspect of the techniques, a Clinical Document Architecture (CDA) system is created as an interlingua for automated interpretation in a clinical setting. Interlingua is a formal representation of the semantic content of a written or spoken utterance. Techniques can be implemented to use the interlingua as the basis for translation from one natural language to another.

In some implementations, CDA2 and SNOMED-CT are implemented as the interlingua for use in those portions of the encounter where clinical accuracy is essential. However, other suitable techniques in medical ontologies can also be implemented. CDA2 is a publicly available standard from the Health Level 7® (HL7) organization. A clinical document architecture system can be implemented to exploit the fact that CDA2, used in conjunction with a formal medical vocabulary (e.g. the Systematic Nomenclature of Medicine—Clinical Terminology (SNOMED-CT) which is available with a plurality of language editions all unified by use of the same numeric codes) and a natural language processing (NLP) engine to map natural language, becomes an interlingua. The strengths of CDA2 and SNOMED-CT are in the coverage of medical concepts, the ability to formally assemble concepts in a coherent representation of an encounter, and the ability to easily map that formal representation to a variety of applications via XSLT and alternate language representations.

A sample selection from a CDA2/SNOMED-CT representation from the earlier dialog is as follows:

```
<section>
    <title>Question</title>
    <entry>
        <observation>
            <code
                codeSystemName="SNOMED CT"
                displayName="Chief Complaint" />
            <value xsi:type="CD"
                code="44188002"
                codeSystemName="SNOMED CT"
                displayName="fall in shower">
            </value>
        </observation>
        <observation>
                codeSystemName="SNOMED CT"
                displayName="Chief Complaint" />
            <value xsi:type="CD"
                code="22253000"
                codeSystemName="SNOMED CT"
                displayName="pain" >
                <qualifier>
                    <name
                        displayName="finding site" />
                    <value
                        codeSystemName="SNOMED CT"
                        displayName="wrist" />
```

```
            </qualifier>
            <qualifier>
                <name
                    displayName="laterality" />
                <value
                    codeSystemName="SNOMED
                    CT"
                    displayName="left" />
            </qualifier>
        </value>
    </observation>
</entry>
</section>
```

Although nomenclatures such as SNOMED-CT provide coverage for concepts such as embarrassment, inappropriate behavior, identification of cultural and value components related to pain management, etc., they do not provide insights into the actual cultural components that affect these concepts. In some implementation, a Clinical Document Architecture system is implemented to separately develop the cultural components for building a reliable archive of cultural components. The archiving can be implemented by attaching metadata to specific semi-knowledge entries along with corresponding flags (or identifiers) and helps. The techniques can be further expanded so as to use the considerable waiting time that patients typically experience in medical settings. During the waiting time, a patient interacts with the clinical document architecture system, which would interactively provide language and culture specific materials to educate and acculturate the patient.

In some implementations, the techniques for providing automated translation and interpretation as described in FIGS. 1-3 can be implemented using one or more computer programs comprising computer executable code stored on a computer readable medium and executing on the processing system 108. The computer readable medium may include a hard disk drive, a flash memory device, a random access memory device such as DRAM and SDRAM, removable storage medium such as CD-ROM and DVD-ROM, a tape, a floppy disk, a CompactFlash memory card, a if secure digital (SD) memory card, or some other storage device.

In some implementations, the computer executable code may include multiple portions or modules, with each portion designed to perform a specific function described in connection with FIGS. 1-3 above. In some implementations, the techniques may be implemented using hardware such as a microprocessor, a microcontroller, an embedded microcontroller with internal memory, or an erasable programmable read only memory (EPROM) encoding computer executable instructions for performing the techniques described in connection with FIGS. 1-3. In other implementations, the techniques may be implemented using a combination of software and hardware.

Processors suitable for the execution of a computer program include, by way of example, both general and special purpose microprocessors, and any one or more processors of any kind of digital computer, including graphics processors, such as a GPU. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile a feedback); and input from the user can be received in any form, including acoustic, speech, or tactile input.

A number of embodiments of the invention have been described. Nevertheless, it will be understood that various modifications may be made without departing from the spirit a and scope of the invention. Accordingly, other embodiments are within the scope of the following claims.

What is claimed is:

1. A method performed by a data processing device, the method comprising:
   receiving, at the data processing device, spoken language-based content;
   processing, at the data processing device, the received language-based content to translate the received language-based content into a target language;
   detecting, at the data processing device, a presence of a cultural sensitivity in the received language-based content; and
   determining, at the data processing device, guidance for dealing with the detected cultural sensitivity.

2. The method of claim 1, wherein processing the received language-based content comprises interpreting the language-based content into the target language.

3. The method of claim 2, further comprising generating an output of the interpreting and translating as one or more of electronic text data and electronic speech data.

4. The method of claim 1, further comprising detecting, at the data processing device, a presence of a social sensitivity in the received language-based content.

5. The method of claim 2, further comprising developing, at the data processing device, an interlingua to perform the interpreting in a clinical encounter.

6. The method of claim 5, wherein developing the interlingua comprises implementing a Clinical Document Architecture—Revision 2® (CDA-2) in conjunction with a formal medical vocabulary system.

7. The method of claim 1, further comprising determining, at the data processing device, whether processing the language-based content requires a human review.

8. The method of claim 1, further comprising classifying, at the data processing device, the language-based content as having an immediate importance during a medical encounter.

9. The method of claim 1, further comprising classifying, at the data processing device, the language-based content as having a durable importance beyond a temporal scope of a medical encounter.

10. The method of claim 9, further comprising storing in an electronic health record a representation of the received language-based content classified as having a durable importance.

11. The method of claim 10, wherein storing comprises storing a CDA-2 representation of the received language-based content classified as having a durable importance.

12. The method of claim 1, further comprising applying, at the data processing device, one or more identifiers to the language-based content, wherein the identifiers are associated with one or more warnings related to a subject matter known to have cultural sensitivities for the user in the target language.

13. The method of claim 1, further comprising applying, at the data processing device, one or more identifiers to the language-based content, wherein the identifiers are associated with a subject matter that is difficult to translate into the target language.

14. A system for providing an automated translation, the system comprising:
   a receiving unit configured to receive a verbal communication from a user;
   a processing unit in communication with the receiving unit, the processing unit configured to:
      identify a presence of a cultural sensitivity in the received verbal communication;
      determine guidance for dealing with the identified cultural sensitivity; and
      translate the verbal communication into a target language.

15. The system of claim 14, wherein the processing unit is further configured to interpret the received verbal communication.

16. The system of claim 15, wherein the processing unit is further configured to render an output of the interpretation and translation into one or more of electronic text data and electronic speech data.

17. The system of claim 14, wherein the processing unit is further configured to detect a presence of a social sensitivity in the received verbal communication.

18. The system of claim 14, wherein the processing unit is further configured to generate an interlingua for automated interpretation in a clinical encounter.

19. The system of claim 18, wherein the generated interlingua comprises a Clinical Document Architecture—Revision 2® (CDA-2) in conjunction with a formal medical vocabulary system.

20. The system of claim 15, wherein the processing unit is further configured to determine whether interpreting the received verbal communication requires a human review.

21. The system of claim 14, wherein the processing unit is further configured to classify the received verbal communication as having an immediate importance during a medical encounter.

22. The system of claim 14, wherein the processing unit is further configured to classify the received verbal communication as having a durable importance beyond a temporal scope of a medical encounter.

23. The system of claim 22, wherein the processing unit is further configured to store in an electronic health record a representation of the received verbal communication classified as having a durable importance.

24. The system of claim 23, wherein the representation of the received verbal communication classified as having a durable importance comprises CDA-2 representation.

25. The system of claim 14, wherein the processing unit is further configured to apply one or more identifiers to the received verbal communication, wherein the identifiers are associated with one or more warnings related to a subject matter known to have cultural sensitivities for the user in the target language.

26. The system of claim 14, wherein the processing unit is further configured to apply one or more identifiers to the received verbal communication, wherein the identifiers are associated with a subject matter that is difficult to translate into the target language.

* * * * *

UNITED STATES PATENT AND TRADEMARK OFFICE
CERTIFICATE OF CORRECTION

PATENT NO.       : 8,423,370 B2
APPLICATION NO.  : 13/089823
DATED            : April 16, 2013
INVENTOR(S)      : Daniel T. Heinze It is certified that error appears in the above-identified patent and that said Letters Patent is hereby corrected as shown below:

In the Specification:

| Column | Line | PTO | Should Be |
|---|---|---|---|
| 3 | 36-37 | implemented to is facilitate | implemented to facilitate |
| 4 | 1-2 | semi-knowledge le of the | semi-knowledge of the |
| 4 | 6-7 | forwarded to a is processing | forwarded to a processing |
| 7 | 1 | "Caó en la ducha y lastimé mi mũfieca." | "Cai en la ducha y lastimé mi muñeca." |
| 7 | 38 | de la mu ñ eca. | de la muñeca. |
| 9 | 41 | card, a if secure digital | card, a secure digital |
| 10 | 19-20 | or tactile a feedback | or tactile feedback |
| 10 | 24-25 | spirit a and scope | spirit and scope |

Signed and Sealed this
Twentieth Day of August, 2013

Teresa Stanek Rea
*Acting Director of the United States Patent and Trademark Office*